United States Patent
Hohmann et al.

(10) Patent No.: US 7,489,297 B2
(45) Date of Patent: Feb. 10, 2009

(54) METHOD FOR DISPLAYING INFORMATION AND INFORMATION DISPLAY SYSTEM

(75) Inventors: Peter Hohmann, Arese (IT); Dave Slocombe, Tokyo (JP); Natasha Sopieva, Ivrea (IT); Adrian Ashley, Leicester (GB)

(73) Assignee: Hitachi, Ltd., Tokyo (JP)

( * ) Notice: Subject to any disclaimer, the term of this patent is extended or adjusted under 35 U.S.C. 154(b) by 542 days.

(21) Appl. No.: 11/122,025

(22) Filed: May 5, 2005

(65) Prior Publication Data

US 2005/0253807 A1    Nov. 17, 2005

(30) Foreign Application Priority Data

May 11, 2004    (EP)    .................... 04425336

(51) Int. Cl.
*G06F 3/033*    (2006.01)
*G01B 11/14*    (2006.01)

(52) U.S. Cl. .................... 345/158; 345/156; 345/157; 345/179; 356/614; 356/615; 356/622

(58) Field of Classification Search .................... 345/1.2, 345/82, 87, 156, 157, 158, 179, 180, 181; 356/614, 615, 616, 621; 178/18.01, 19.01, 178/19.05; 348/744
See application file for complete search history.

(56) References Cited

U.S. PATENT DOCUMENTS

| 4,917,373 | A | | 4/1990 | Bourne et al. |
| 5,138,304 | A | * | 8/1992 | Bronson .................... 345/157 |
| 5,793,361 | A | * | 8/1998 | Kahn et al. .................... 345/179 |
| 5,900,863 | A | | 5/1999 | Numazaki |
| 5,914,783 | A | * | 6/1999 | Barrus .................... 356/614 |
| 6,100,871 | A | | 8/2000 | Min |
| 6,307,952 | B1 | | 10/2001 | Dietz |
| 6,694,058 | B1 | | 2/2004 | Burchart et al. |
| 6,717,073 | B2 | * | 4/2004 | Xu et al. .................... 178/18.04 |
| 7,180,510 | B2 | * | 2/2007 | Inoue et al. .................... 345/180 |
| 2002/0024500 | A1 | | 2/2002 | Howard |
| 2003/0156756 | A1 | | 8/2003 | Gokturk et al. |

FOREIGN PATENT DOCUMENTS

| DE | 102 42 890 A1 | 3/2004 |
| WO | WO 01/88681 A1 | 11/2001 |

* cited by examiner

*Primary Examiner*—My-Chau T Tran
(74) *Attorney, Agent, or Firm*—Antonelli, Terry, Stout & Kraus, LLP.

(57) ABSTRACT

An information display system has a display unit having a display screen, a control unit for controlling the displayed information, and an input devices for inputting a user's control command. The input devices may be a distance detecting sensor adapted to detect the position of a user controlled object in a sensing field arranged at a given distance in front of the screen. The control unit is adapted to determine a display control command based on the detected object position.

15 Claims, 7 Drawing Sheets

30

31

32

METHOD FOR DISPLAYING INFORMATION AND INFORMATION DISPLAY SYSTEM

CLAIM OF PRIORITY

The present application claims priority from European patent application No. 04425336.7, filed on May 11, 2004, the content of which is hereby incorporated by reference into this application.

BACKGROUND OF THE INVENTION

The invention relates to a method which may be used for displaying information on a display screen and to an information display system.

Graphical user interfaces are very common for presenting information on a display device to a user and for allowing the user to input control commands by interacting with icons on the screen. For manoeuvring around and activating icons, thereby initiating or manipulating a processing sequence, mechanical devices, such as a keyboard or a computer mouse, are well known. However, when providing a display screen in a public space, it is often the case that these mechanical devices are not useful because they require (horizontal) working space in which to be operated and are vulnerable to environmental stress, dirt and vandalism.

Accordingly, a touch screen device is often employed for use in information kiosks provided in a public space. However, a touch screen requires frequent maintenance since it breaks easily, and it is also susceptible to the deposit of dirt on the screen, which may happen easily, e.g., because the user must touch the screen surface with his fingers. In addition, the size of touch screen displays is limited, which becomes relevant as screen sizes noticeably increase in size, in particular for flat screen technologies, such as plasma displays or projecting devices. Also, there are no commercial touch screen solutions for LCD projectors readily available.

SUMMARY OF THE INVENTION

It is an object of the present invention to provide a method for use in displaying information on a display screen and an information delivery system which will allow a user-friendly control of the displayed information without having the need for the user to touch any input device.

This object is achieved by subject written defined in the independent claims appended hereto. The dependent claims refer to preferred embodiments of the invention.

An information display system (kiosk) according to the present invention comprises a display unit having a display screen, a control unit for controlling the displayed information, and input means for inputting a user's control command. The input means may comprise an active distance detecting sensor, e.g., a beam emitting and capturing device, for detecting the position of a user controlled object in a sensing field.

DETAIL DESCRIPTION OF THE PREFERRED EMBODIMENTS

Figure 1:
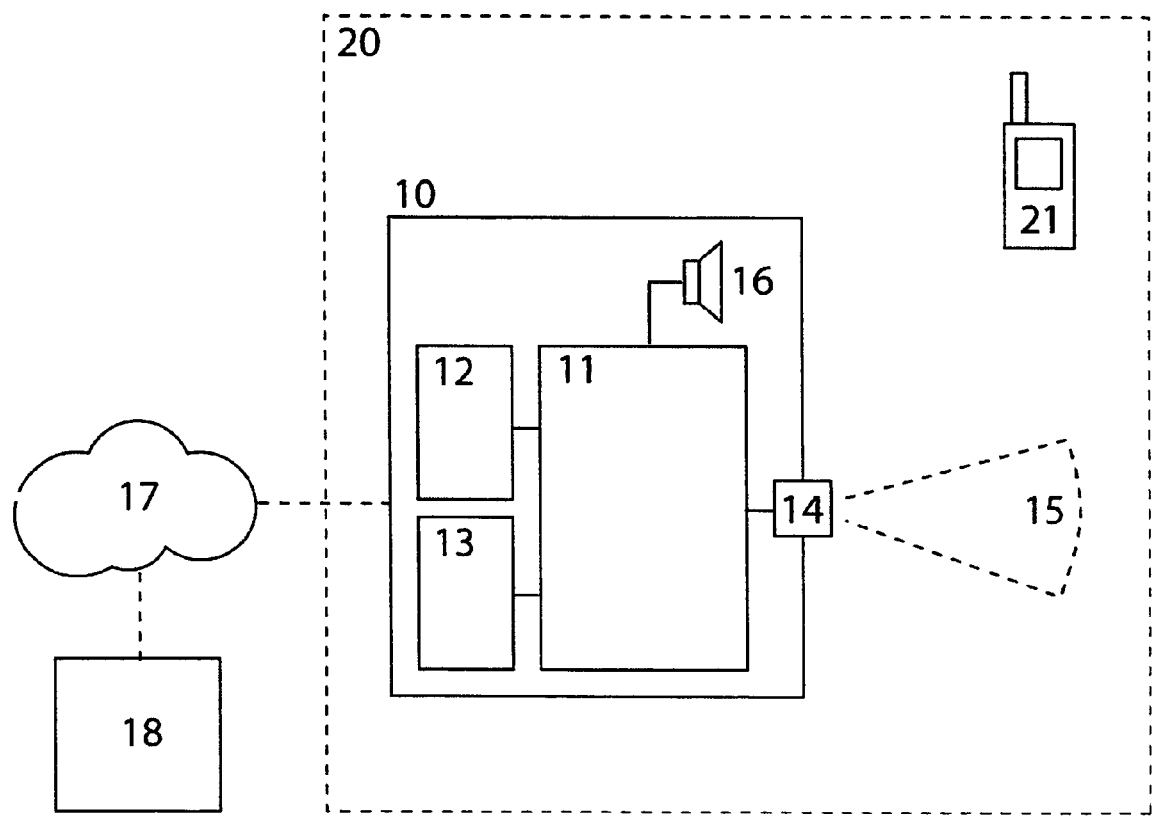
FIG. 1 is a block diagram of an information display system according to an embodiment of the present invention.

An information display system (kiosk) according to the present invention comprises a display unit having a display screen, a control unit for controlling the displayed information, and input means for inputting a user's control command. The input means may comprise an active distance detecting sensor, e.g., a beam emitting and capturing device, for detecting the position of a user controlled object in a sensing field.

The sensing field is preferably arranged at a given distance in front of the screen. The sensing field is preferably a substantially rectangular parallelepiped which occupies some space to permit user interaction in front of the screen. The sensing field may be arranged in parallel to the screen, but the invention is not restricted thereto. The dimensions of the sensing field may be selected according to the particular arrangement of the screen, the distance between the sensing field and the screen, and/or the application. For instance, if the distance is small, e.g., a few centimetres to 0.5 meter, the size of the front and back surfaces of the sensing field may correspond substantially to the size of the display screen. If the distance to the screen becomes larger, the dimensions of the sensing field may be smaller than the active screen surface. This allows a user to control the displayed information on a very large screen, while manoeuvring an object in a sensing field, which can be easily handled by the user while having the impression of controlling the entire screen by means of perspective effects.

The depth of the sensing field in the direction towards the screen may depend upon the size of the user controlled object. It is preferred that the user controlled object is the user's hand and the information delivery system is controlled by the hand alone. Thus, no additional pointing device is required, and the preferred depth of the sensing field is between 20 and 30 cm. This allows the user to easily bring his hand into the sensing field, to manoeuvre it around while keeping it inside, and to deliberately remove it from the sensing field.

Preferably, the position of the sensing field is marked, e.g. by some lines on the floor, on the walls, or on other objects, so that the position and extension of the sensing field can be easily recognized by the user. For that reason, it is usually sufficient to provide a single marking in front of the display screen indicating the far end of the sensing field.

It is further preferred to provide a visual, tactile and/or audio signal when the user and/or the user controlled object enters the sensor field for the first time. This could be done, e.g., by changing the type of displayed information so that the user knows that he or the object has entered the area of attention of the information display system. It is additionally useful to detect that the object in the sensing field has changed, e.g., when a user, which uses his hand to control the system, has come too close to the sensing field, so that other body parts have entered this area of attention. This may be accomplished, e.g., by detecting that a plurality of objects are located in the sensing field, or by detecting the size of the object and comparing it to the size of a preferred object, such as the user's hand. When detecting such a situation, it is suitable to display a warning on the screen and to request the user to step back.

A display control command for controlling the type, the content and/or other features of the displayed information may be determined based on the detected object position. This allows the user to control the presented information by positioning the object, for instance, the user's band, in a certain area of the sensing field. Many gesture-like movements may be recognized, based on the detected object position, and these movements maybe used for controlling the displayed information. This has the advantage that the information delivery system is controlled without the need for touching any input device, thus improving the hygiene for publicly available information display systems. The system is furthermore insusceptible to dirt and vandalism, since the display screen and the other system components may be arranged in a closed housing, e.g. behind a glass window.

The control unit may determine the control command according to a match of a displayed control command prompt and the detected object position. This allows the user to control the system by positioning the object at a position indicated by a control command prompt. For a simple interaction, the control command prompt could indicate that specific system actions are performed (i.e. the respective control commands generated) when the user positions his hand in certain areas of the sensing field. These selection areas may be parts of the sensing field which are identified with respect to the user's perspective in the direction of the screen. For example, the control command prompt can instruct the user to point with his hand towards the center of the screen, the corners of the screen, or other identifiable screen parts in order to perform a selection or to activate a process. Furthermore, a graphical user interface may be installed which can display icons/images that are placed on the display screen in a direct visual and spatial relationship with the object (or hand) that is pointing at the screen.

The control unit may further determine the control command according to a detected movement and/or velocity of the object. This makes it possible to implement simple and intuitive gestures for controlling the system, such as the wave of the hand for abandoning a selection or aborting a started process. The graphical user interface may display graphics that can be animated with the movement And/or velocity of an object (or hand) that is moving in front of the display screen. Prompts and the content may refer to the speed of the interactions in size and attitude. This is also called a "smart GUI".

The control unit preferably measures the time that the object is in or out of the sensing field. This makes it possible to determine the activity of the user. If no activity is detected for a while, it may be concluded that the user has lost his interest or has walked away. This makes it possible to abort the processing and to prepare the system for a new task or user interaction. In this case, the information display system may, e.g., move up one level in a multi-layered user interaction schema. After a while, without any activity, the system may decide to enter a welcome state and to display a corresponding welcome screen inviting new users to approach. The time an object is in or out of the sensing field may be further used as a trigger to software and to prompt additional events.

According to a preferred embodiment of the invention, control command prompts, such as icons or symbols, are displayed on the screen. The control unit may detect a correspondence between the position of a displayed control command prompt on the screen and the detected object position. This allows the user to point with his hand to an icon on the screen in order to perform a desired action.

In order to enhance the confidence and reliability of prompt selections, it is preferred to start a timer for a predetermined time interval when correspondence between a prompt and an object position is determined. This preliminarily selects the command prompt for further confirmation. The control command may be finally generated when the correspondence between the prompt position and the object position persists until the timer expires. This means that the position of the object must match the position of the prompt for a given time interval before a final selection is performed. Thus, accidental selections due to the passing by of the object position or an uncontrolled movement of the object in the sensing field are avoided. The expiration of the timer according to this design of the user interface interaction may be compared to a mouse click performed in order to activate some action.

It is further preferred to detect that the object is directly removed from the sensing field after the timer has been activated. If the object is not re-inserted in the sensing field before the timer expires, the corresponding command prompt may be finally selected and the respective control command may be generated. This has the advantage that the user is not obliged to keep the object in the selected position until the timer expires, which facilitates the interaction and the operation of the user interface.

The logic in the control unit driving the placement, removal and navigation using graphics on the visual display screen may derive its ability to do so by timing events that occur. For example, the time a user's hand is over a navigation button is used as a trigger to activate the navigation event. Even if the count down of the prompt has started, once the hand moves out of the navigation area and moves over other prompts, the first action is terminated and the GUI changes in respect to that.

A typical course of action for performing a prompt selection according to the invention would be as follows: The user enters his hand in the sensing field and points towards the intended command prompt (e.g. one of a plurality of icons displayed on the screen). In order to help the user in pointing, an indicator representing the currently detected position of the user's hand may be displayed on the screen. This visual feedback may act as a cursor and help the user to aim with his hand to the targeted icon. When the object position corresponds to the position of the targeted prompt, the user may keep still for the given time interval (say 1 second) or draw back his hand from the sensing field and wait for the predetermined time interval. After the elapse of this time period, the icon is finally selected and the respective control command is generated. This provides an easy and intuitive user interface for controlling the information display system just by the movement of the user's hand. It is easy to learn and suitable for occasional users, such as people walking by incidentally.

In order to indicate to the user that the command prompt has been preliminary selected and the timer started, it is preferred to provide visual, tactile and/or acoustic feedback information to the user. Reaching into the sensing field and moving the object over a prompt, the user may receive a visual and acoustic feedback in relation to the content shown in order to confirm the action. Thus, the user is informed that some selection is in process and that, by keeping still for a given time period or by retracting the object from the sensing field, the selection can be made permanently. Preferably, the temporarily selected command prompt is indicated on the screen so that the user can verify the correctness of the selection. It is further preferred to indicate to the user the progress of the timer until the final selection. This can be done visually, e.g. by changing the colour of the selected icon, showing a clock or sandglass indicating the elapsed time of the predetermined time interval until the final selection, or by providing rising sounds, beeps with increasing speed, etc. A vibrating device may be used to provide a tactile feedback.

According to a preferred embodiment, the command prompts or icons displayed on the screen have the basic form of a circle. An icon may change its color and an annular ring embracing the icon may be displayed when the icon is preliminary selected. The ring may fill up like a clock when the timer proceeds to indicate the elapsed time and the remaining time until the icon is permanently selected. This allows the user to easily verify the correctness of the selection and to judge the selection progress. The user may decide to cancel the selection, if desired, by moving the object to another position or by re-inserting the object in the sensing field before the selection becomes permanent.

The input means may comprise a plurality of sensors which are arranged such that their detection beams propagate substantially parallel to the screen. The detection beams may overlap and form the sensing field. The sensing field may extend substantially parallel to the screen. An array of sensors that are organized so as to cover the visible display area of the screen will allow this area to be interacted with by a user which can navigate on the screen interface. Scalability of sensors for a different application complexity is featured with that design.

Preferably, the sensing field is generated by restricting the detected distances up to a predetermined maximum distance. This makes it possible to design an exact area of attention which is monitored by the input means.

Preferred sensors are ultrasonic, infrared or laser distance sensors. These sensors are suitable for measuring a distance or the motion of an object in a given detection range. The sensors may be arranged in a frame which has substantially the size of the screen and is located in front of the screen and is attached thereto. This has the advantage of a simple mounting of the sensors in fixed given positions.

The sensing field is preferably (logically) divided in a grid of sensing areas, i.e., volume elements in the space forming the sensing field. If the sensing field extends beyond the size of the screen, only the relevant part directly in front of the screen may be considered. The grid is preferably formed from squares arranged in the sensing field resulting in a plurality of sensing area cuboids. Detected object positions outside of the sensing area grid may be discarded, thus restricting the monitored space to the volume defined by the sensing areas. Thus, a sensing field having the form of a parallelepiped with a front surface and a back surface at predetermined distances from the screen may be formed.

The control unit may assign the detected position of the object to the corresponding sensing area (i.e. volume element) including the detected position. Thus, a particular sensor reading of an object may be allocated to a particular grid coordinate. This allows further processing of the detected position to be based on the identities of the sensing areas, which facilitates the program for signal processing and pattern matching, and increases the reliability of the system.

The dimensions of the sensing areas may relate to the size of the object. This has the advantage that the resolution of the detected position in the sensing field depends on the object size. If the user's hand is used as a pointing object, it is preferred to set the grid size to 10 cm, corresponding approximately to the average size of a human hand. Then, the sensor grid is calibrated to be the most efficient at detecting the average male hand size in all rotational positions. Smaller sized sensing areas or a higher detector resolution would not help for determining the correspondence between the (middle) hand position and the prompt position because it would be influenced by the exact orientation of the hand, and possibly the fingers. Thus, an appropriate dimension of the sensing areas simplifies the processing of the signals and the programming of the software.

For an enhanced man-machine interaction and, at the same time, for inviting the user to enter deeper into the system's content, it is preferred that the system reacts depending on the position of the user. Thus, the input means may further comprise a distance sensor to detect the distance of the object and/or the user from the screen. This makes it possible to judge whether the user is far away from the screen or close to the screen. The distance sensor is preferably an ultrasonic, infrared or laser distance sensor having a detection beam oriented substantially perpendicular to the screen. This allows the system to detect, e.g., an approaching person who is coming close to the display unit. Thus, the display of information may be activated, a welcome screen presented, an audio message played, etc., in response to such detection.

Preferably, the size, the type and/or the position of displayed information anchor of control command prompts is controlled depending on the detected object or user distance. For instance, the front size of displayed text information or the size of displayed images may be reduced when the user approaches the screen and comes closer. Furthermore, the type of displayed information may be changed from a welcome message or an invitation to approach a control menu for interactive use. Also, when a user approaches the screen, control command prompts may appear automatically to allow user interaction. In a user interface having a three dimensional look, icons or symbols may emerge or recede depending on the detected user distance.

In order to compensate for sensor failures, it is possible to detect the correct performance of the sensor and to control the type, displayed size and/or position of displayed information accordingly. This has the advantage that, when a sensor covering a part of the sensing field experiences a failure, the command prompts may be rearranged on the screen so that the user can still activate them with the remaining active part of the sensing field. In the case of a malfunctioning sensor, the malfunction can be detected and the graphical user interface may be dynamically reorganized to allow the user to continue interacting with the display interface. For example, prompts may be automatically arranged in new positions bypassing the malfunction. Thus, the information display system is fault tolerant and may be still be operated even though a sensor drops out or has a reduced performance, e.g., due to some environmental impact, such as dirt covering the sensor probe. This increases the maintenance cycles and the life time for a display system arranged in a public space.

The input means may be further adapted to compensate static objects in the sensing field. This may happen when the information display system is placed in a public space and a user puts an object in the sensing field. If this object remains in the sensing field, it is a static obstacle which can be compensated so that it is not treated as a user controlled object, i.e. its position is not used for determining a correspondence with a command prompt. This prevents erroneous selections and activations of command prompts. Furthermore, if due to the sensor arrangement, parts of the sensing field in the shadow of the static object become unusable, it is preferred that the screen layout is rearranged so that no command prompts are positioned in correspondence to the unusable part of the sensing field. This helps further to improve the reliability and robustness of the system.

In the case where the sensor field is obscured by an object, the sensor may be de-activated, and periodically re-activated to check for the continued presence of the obstruction. In the case where the obstruction is removed, then normal operation may continue. For the time an obstruction is present, the GUI may adjust itself automatically.

According to a preferred embodiment of the invention, a wireless communication means for communicating with a wireless mobile device may be provided. The wireless communication means may be based on a short-range radio communication, such as Bluetooth, or an infrared communication technology. This allows the information display system of the invention to exchange information with a wireless mobile device, such as a smart phone, a PDA, etc., in the proximity of the screen. For instance, it is possible with use of the invention to attract the user's attention to the displayed information by sending a message (e.g. SMS) to the mobile device, by placing a call to the mobile device, by activating the ringer or the vibrator of the mobile device, etc. It is also possible to transmit information relating to the information displayed on the screen to the mobile device. The user can carry away this information, such as a telephone number, an address, a URL and/or a reminder to perform some action, etc. This allows the user to take home some useful information without the need to write it down, and makes the presented information display system even more suitable for usage in a public space.

In a preferred application of the invention, the attention of a user in the proximity of the display screen is attracted by presenting attractive information on the screen, by playing an inviting audio message over a loudspeaker, and/or by sending a message to the user's mobile device. When the user approaches the screen, the kiosk automatically switches the type of displayed information so that the user can interact and control the system by moving his hand in the sensing field. When the user has navigated his way through the possibly multi-layered user interface and found the needed information (e.g. a departure or arrival time, a telephone number, an address, etc.), the information may be automatically sent to the user's mobile device. Thus, the user can easily take home any useful information for later usage.

Preferably, the information to be displayed is stored in a database unit and accessed by the control unit depending on the generated control commands. For instance, the stored information in a timetable information kiosk relates to a bus, train and/or plane timetable, the respective tariffs and other information. The generated control commands may even allow the control unit to input new information in the database, e.g. to make a reservation, buy a ticket, etc.

For ease of maintenance, it is preferred that the control unit and the database unit are connected by a communication network. Information selected for display and/or as an input for the database may be transmitted from the data base unit via the communication network to the control unit and vice versa. The communication network may be a wire-line network, e.g. telephone line based, broadband, DSL, or a wireless network. This allows a centralized maintenance of the content database, wherein a plurality of information kiosks may be located at many different places without the need for updating and maintaining the local information databases in the kiosks.

The present invention provides an information display system which allows a simple and intuitive usage by moving the user's hand in a sensing field and, thereby, activating command prompts. The kiosk is robust with respect to user interaction and environmental stress. Since it has no parts which must be touched by the user, it can be placed in an adverse environment and is not susceptible to vandalism.

According to a method for displaying information on a display screen, the position of a user controlled object in a sensing field may be detected using an active distance detecting sensor. Based on the detected object position, a display control command may be generated. The displayed information may be controlled based on the generated display control command. This allows the user to select the information displayed on a display screen by moving an object, e.g., his hand, in a sensing field which is arranged at a given distance in front of the screen.

In order to allow a selection of different options, at least one control command prompt may be displayed on the screen. The position of a displayed control command prompt and the detected object position may be matched and a respective correspondence determined. The time that the correspondence exists is preferably measured, and the display control command is determined based on the detected correspondence and the measured time. By requiring a predetermined time interval for the correspondence, it is possible to reduce accidental command prompt selections.

It is further preferred to determine a movement and/or a velocity of the object in the sensing field, and to determine the display control command based on the detected movement and/or velocity. This makes it possible to implement simple gestures performed by the object for controlling the displayed information. Such simple gestures can be a horizontal, vertical, diagonal and/or circular movement of the user's hand in the sensing field. Preferably some useful actions or processes are assigned to the gestures. This allows for a number of control commands, such as abandon a processing, move backwards in a command structure hierarchy, go to the beginning, etc.

The sensing field may be divided into a grid of equal sized sensing areas which each take up a certain volume of the sensing field. By assigning the detected position of the object to the respective sensing area that includes the object position, the further processing for the object position may be based on an identifier of the assigned sensing area. This provides some averaging of the object position and smoothes the same. By relating the sensing area dimensions to the size of the object, the resolution of the detected object position may also be adapted to the object size. This makes it possible to determine the position of an irregular shaped object, such as a human's hand, without considering the exact orientation and/or form of the object.

According to a preferred embodiment of the invention, the distance of the object and/or of the user from the screen is detected, and the type, displayed size, and/or position of displayed information and/or of control command prompts is controlled depending on the detected distance. Thus, the displayed content may be changed when a user approaches or departs from the screen, which allows for different states of the user/kiosk interaction. For example, in an invitation state, an eye catching picture or film sequence may be displayed, in a communication state an interactive user interface may appear on the screen, and, in a leaving state, a good bye message may be played.

In order to enhance the failure safeness, it is preferred to determine the correct performance and/or failure of the sensor or the individual sensors. This makes it possible to control the type, displayed size, and/or position of displayed information and/or control command prompts depending on the detected operation state of the sensor.

The present invention provides a method for displaying information in a public space, wherein people passing by may interact intuitively to control the presented information, pictures, movies, audio, text, etc. It makes it possible to present interactive advertising, and to play interactive games in public places.

These and other potential objects, features and advantages of the present invention will appear fully from the following detailed description of preferred embodiments of the invention. It is to be understood, however, that the scope of the present invention is not limited to the given embodiments shown in the accompanying drawings.

FIG. 1 illustrates schematically an information display system according to an embodiment of the present invention. In a kiosk 10, which can be located in a public space, a display screen 11, a control unit 12 and a wireless and/or wire-line networking device 13 are provided. The display screen 11 is preferably a large flat panel, e.g., a plasma, LCD display. It is also possible to employ a projecting device for projecting a display image on the screen 11. The control unit 12 for controlling the kiosk 10 and the displayed information is preferably implemented by a local computer, e.g., a PC-based computer which is configured with a special computer program.

The networking device 13 provides access to a communication network 17, e.g., the Internet. A database unit 18 is provided on a remote back-end server computer for storing the information to be displayed on the kiosk 10. The networking device 13 also provides an interface to a wireless communication in an area around the kiosk 10. This wireless communication may be implemented by short-range radio communication (e.g. Bluetooth), by infrared technology, or other means suitable for establishing a wireless link to a mobile device 21 within the communication area 20.

Figure 2:
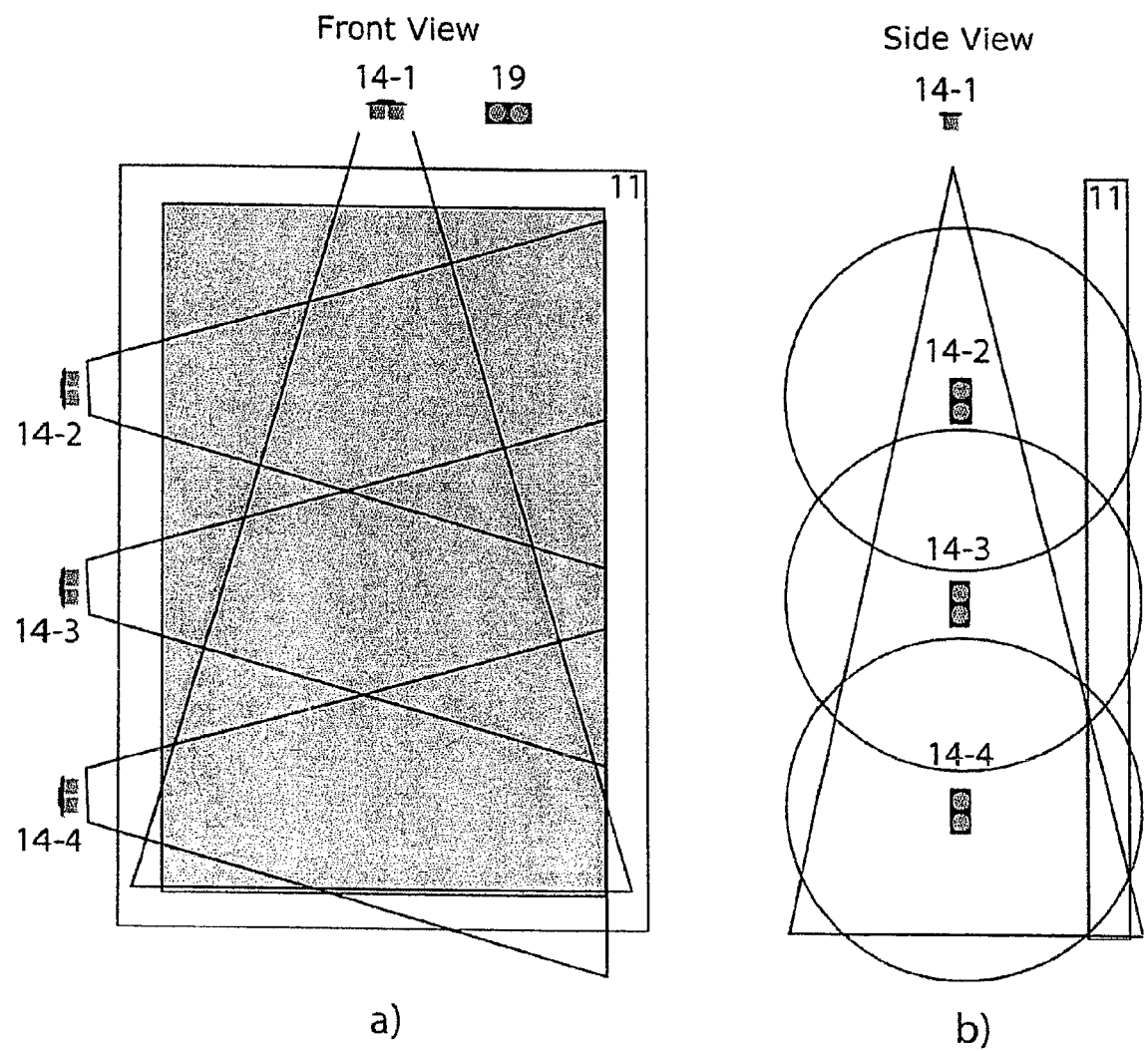
FIGS. 2a and 2b schematically show front and side views, respectively, of a sensor layout according to a preferred embodiment of the invention.
Figure 3:
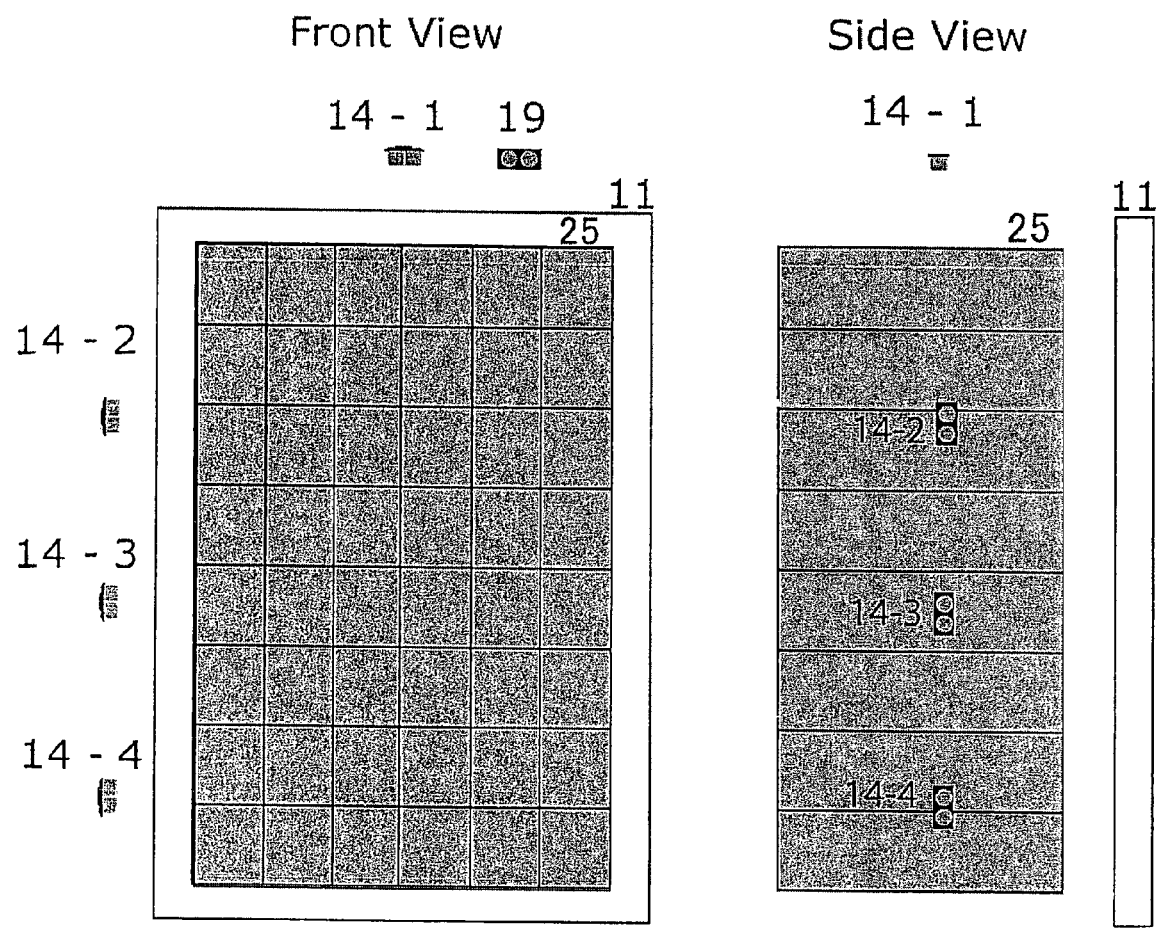
FIGS. 3a and 3b schematically show front and side views, respectively, of a rectangular sensing field having a plurality of sensing areas arranged in a grid.
Figure 3:
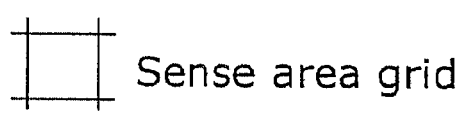

A sensor 14 is provided at the front side of the display screen 11 to detect the position of a user controlled object in a sensing field 15. The sensor 14 is preferably an ultrasonic distance and/or motion detecting sensor and is arranged such that the sensor detection beam propagates substantially parallel to the screen 11. This makes it possible to form a sensing field 15 extending substantially parallel to the screen 11 (see FIGS. 2 and 3).

Furthermore, an audio output 16 is provided to play audio messages, music, and/or acoustic feedback information.

The information display system according to the invention allows dynamic multimedia content to be delivered to the large flat panel display 11 located in the public space. The content may be provided by a centralized back-end server 18, and it may be delivered to the kiosk via the communication network 17 using broad band and/or wireless technology. The kiosk 10 is enabled with a specific sensor layout allowing customers to interact with dynamic content via gesture. The content can react and act dynamically due to the presence of a person. A contact-less drag and drop application may be featured. This allows the display and the interaction field to be kept secure and clean.

In addition, data or information may be transferred from the kiosk 10 to the mobile device 21. For instance, after some interaction with the information display system of the invention, the customer may request by gesture that some information is delivered to his mobile device 21. This allows the user to take away the requested information which may be, e.g., a picture or image taken on the spot by a camera provided in the kiosk 10 or received from the database unit 18. Since such data can usually not be written down by the user and, thus, is not easily taken away, this allows for use of many new applications provided to people walking by the public kiosk 10.

FIGS. 2(a) and 2(b) show schematically a sensor layout according to a preferred embodiment of the invention. FIG. 2a shows a front view of the sensors 14-1 to 14-4 and the display screen 11, and FIG. 2b shows a side view thereof. The sensors 14-1 to 14-4 are arranged on the sides of the display screen 11 such that their sensor beams propagate substantially parallel to the surface of the screen 11. The sensor beams intersect and form a sensing field 15 in front of the visible part of the display screen 11 (grey area).

The sensing field 15 covers most of the visible screen size, but it is possible, as shown in FIG. 2a, that in some areas of the display screen 11 no detection is possible due to the geometries of the sensing beams. This should be considered by the control unit 12 when arranging the displayed command prompts on the screen 11. In this case, the invention proposes to place the prompts only in parts of the screen which are covered by the sensing beams.

A similar situation may happen when one of the sensors 14 fails. For example, if sensor 14-4 has a failure and can not be used anymore, the control unit 12 can automatically rearrange the displayed information such that all displayed command prompts appear in a part of the display screen 11 which can still be sensed and monitored.

In the example depicted in FIGS. 2a and 2b, sensor 14-1 provides an Y-axis vertical sensing, and the sensors 14-2, 14-3, 14-4 provide an X-axis horizontal sensing. An additional sensor 19, having a sensing beam extending substantially perpendicular to the surface of the screen 11, is also provided to detect the presence and approach of an object/person towards the screen 11.

FIG. 2b is a side view which details the geometric arrangement of the sensing beams forming the sensing field 15. Due to the cone-shaped forms of the sensing beams, a complex shape of the sensing volume which can be monitored by the sensors 14-1 to 14-4 emerges.

FIGS. 3a and 3b show schematically the forming of a plurality of (logical) rectangular sensing areas by applying a grid to the sensing field 25. FIG. 3a shows a front view of the sensing area grid and FIG. 3b shows a side view of the resulting sensing area volumes (cuboids). The logical sensing field 25 emerging from dividing the detection area of the sensors in a plurality of adjacent cuboids forms a rectangular well-shaped sensing field arranged with a given distance to the screen 11 in front of the screen 11. Object positions which are outside this parallelepiped sensing field 25 may be discarded so that only positions in the logical sensing field 25 are considered for the actual control of displayed information.

An object position (X,Y-coordinate) within the sensing field 25 is assigned to the corresponding sensing area sector (cuboid) which includes the position. Each sector of the sensing areas provides an individual X and Y location reading of any object that is detected within the sector volume. For simplifying the further processing, the sensing area sectors may have identifiers assigned which may then be used instead of the exact object position.

This is particularly useful, if this grid resolution is also considered for the arrangement of the displayed command prompts on the screen 11, so that only one prompt is arranged in each grid sector, preferably centered therein. The resolution of the coordinates in the depicted example is shown by a grid of 6 by 8 squares.

Please note that, according to the actual sensor layout and the geometries of the sensing beams, some sensing area sectors (e.g. in the left upper corner) may actually be not sensed and monitored by the sensors 14 so that an object in the respective sensing field volume may not be detected. However, this can be taken care of by arranging the items (prompts) on the display screen 11 accordingly. Thus, the control unit 12 will not place a command prompt in such a position.

Figure 4:
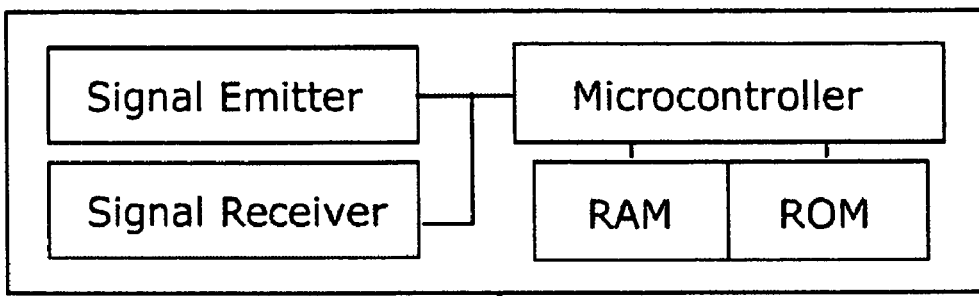
FIG. 4 is a block diagram which shows the components of an information delivery system according to an embodiment of the present invention.
Figure 4:
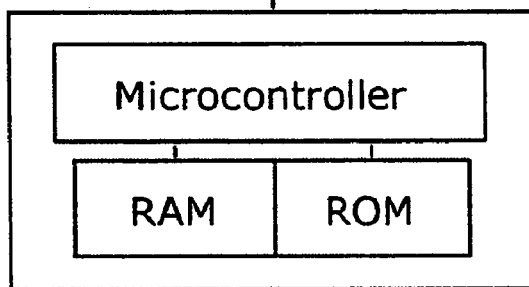
Figure 4:
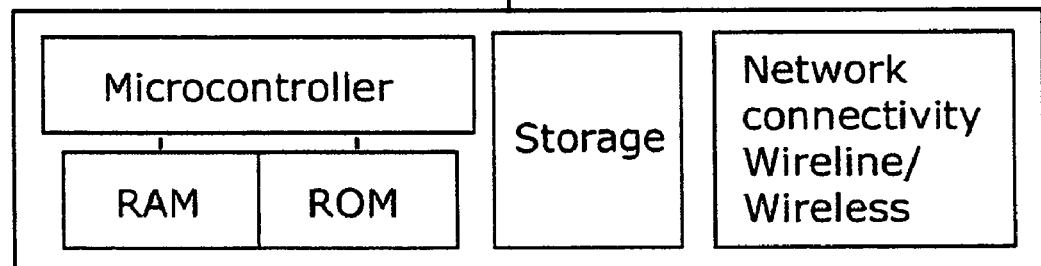

FIG. 4 shows schematically the components of an information delivery system according to an embodiment of the invention. A sensor input device 30, an external microcontroller 31, and a local computer 32 are provided in the kiosk 10. The sensor input device 30 comprises a signal emitter, a signal receiver, a microcontroller, a RAM and a ROM. The external microcontroller 31, which is connected to the sensor input device 30 and the local computer 32 (e.g. via a serial data connection) comprises a microcontroller, a RAM and a ROM. The local computer 32 comprises a microcontroller, a RAM, a ROM, a data/information storage device, and a network device for a wireless or a wire-line network connectivity.

The operation of the object position detection will be described next. The ultrasound sensor provided in the sensor input device 30 emits a sound pulse and listens for the echo of the sound. The time frequency of the sound pulse may be controlled by the microcontroller in the sensor input device 30. The time frequency may be variable depending on the application needs. Preferably, the detection range is adjusted so as to fit to the intended sensing field. Common ultrasound sensors have a range from 3 cm to 3 m.

When an object, in this case the user's hand, enters the range of the ultrasound sensor, the emitted ultrasound pulse reflects off the surface of the hand and returns to the signal receiver which provides the respective timing information to the microcontroller. The microcontroller in the sensor input device 30 performs a "time of flight" calculation (i.e. it determines how long between sending a pulse and hearing the pulse echo) and can thus determine the distance of an object that has entered the detection range of the ultrasound sensor.

The sensor input device 30 is connected by two pins to the external microcontroller 31. One pin is a pulse-out pin that is used by the microcontroller 31 to initiate a distance reading. The second pin is a pulse-in pin also connected to the microcontroller 31. The pulse-in pin may send an analogue signal to the external microcontroller 31, which represents the result of the initiated reading. Once the analogue value has been received by the external microcontroller 31, it has various code functions performed upon it. Firstly, the analogue value may be converted to a digital value using an ADC (analogue to digital converter). The digital value then indicates in centimetres the actual distance of the object (hand) from the sensor. The software operating on the external microcontroller 31 may store several of these readings, and it averages them to smooth the readings of the pulse. The software may then identify which sensor (in case of multiple sensors provided) the value came from. The value in centimetres is then expressed as a position as either an X or Y coordinate. The software controlled process on the external microcontroller 31 may conduct this process with all sensors attached to give a constant X and Y position reading in centimetres.

The coordinates data X, Y is then sent via the serial port connection when it has been requested by the local computer 32. In this case, the software operating on the local computer 32 will send a command to the external microcontroller 31, which listens to this command and performs the related function, which is to send back the requested data. The software on the local computer 32 receives the X and Y coordinates of the detected object in the sensing field and uses this data to detect where the object that has been sensed is in relation to the actual state of the graphical user interface (GUI) displayed on the display screen 11. For instance, if the hand is over a button on the GUI (i.e. the X and Y position of the hand matches the position of the button) then the button will be selected.

Figure 5:
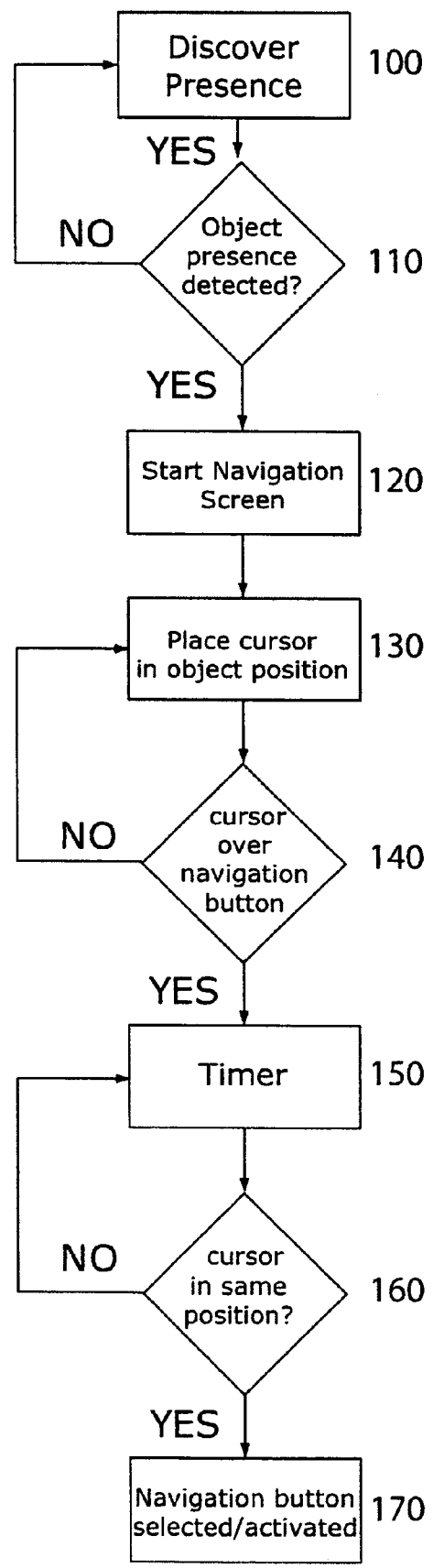
FIG. 5 is a block diagram which shows some basic processing performed by a control unit according to an embodiment of the present invention.

FIG. 5 shows schematically some basic processing performed by the control unit 12. The presence of an object or a person in the proximity of the kiosk 10 is checked in step 100 by reading the value of the proximity sensor 19. If in step 110 it is determined that the presence of an object is detected, the process continues to step 120 for starting the display of the navigation screen. This means that some selectable user prompts are displayed, and the user is invited to interact with the system. In step 130, a cursor is placed on the screen at a position corresponding to the detected object position. This may be performed by reading the X and Y coordinates of the hand in the sensing field as explained before. When the hand is moved in the sensing field, the cursor follows this movement on the screen. In step 140, it is detected whether the cursor is over a displayed navigation button (respectively the hand is located in a corresponding sensing area). If a match of the hand and the displayed navigation button is detected, the timer is started in step 150. After the elapse of the timer, it is determined in step 160 whether the cursor or the hand is still in the same position. In the result is affirmative, the navigation button is selected/activated and the associated process is started on the local computer 32 (step 170). This allows the user to navigate and control the displayed information by moving his hand in the sensing field.

Figure 6:
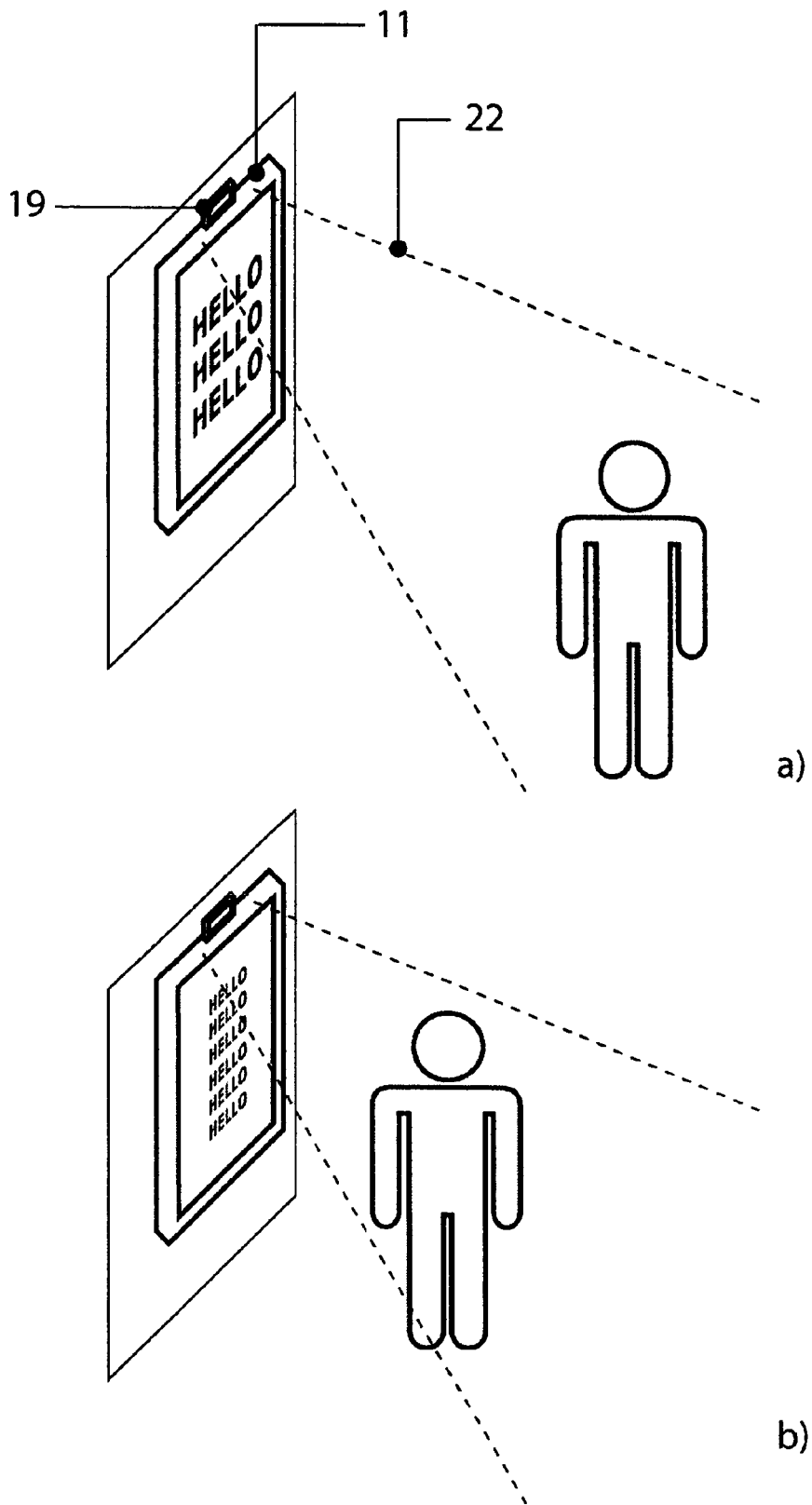
FIGS. 6a and 6b are diagrams which show the dependency of the scale of displayed information with respect to the distance between the user and the screen.

FIGS. 6a and 6b show schematically a situation where the scale (and/or the colour, and/or type) of displayed information of a graphical user interface changes in relation to the distance the user is from the display screen 11. In FIG. 6a, the user is approaching the display screen 11, but is still relatively far. The user in the sensing field 22 is detected by the sensor 19, and a welcome message "HELLO" is displayed in a large font. This allows the user to easily read the text and may attract his attention. When the user comes closer to the display 11, this is detected by the sensor 19, and the control unit 12 may change the font size to a smaller font in order to present more and possibly more detailed information. Now, since the user is closer to the screen 11, the text displayed in the small font size may be easily recognized by the user. As an alternative, the type of displayed information may be changed, e.g., by switching the displayed information from a welcome message to a navigation screen.

FIGS. 7a to 7d show schematically the principle of visual feedback provided to the user during the selection of a command prompt. For example four navigation items (buttons) labelled A-D are displayed on the screen 11. A cursor in the form of cross wires is displayed in the center of FIG. 7a.

Figure 7:
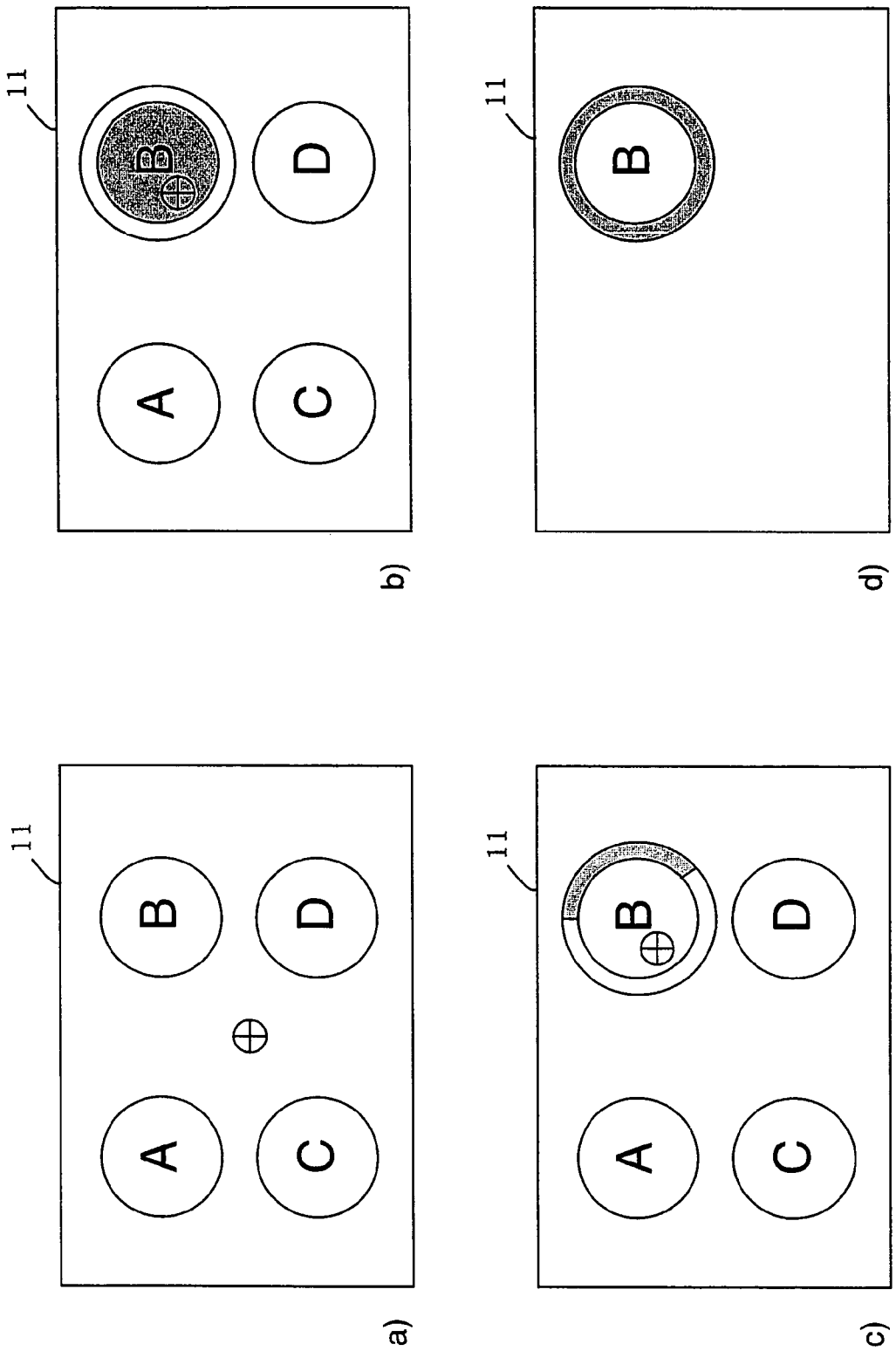
FIGS. 7a to 7d are diagrams which show the principle of visual feedback provided to the user during the selection of a command prompt.

In FIG. 7b, the user has moved the cursor with his hand to button B which has therefore changed its colour (grey) to indicate that the button has preliminary been selected. In addition, a ring is displayed around the circular button B. Now, the timer for confirming the selection is started.

In FIG. 7c, the annular ring around button B has partially filled up to indicate the lapse of time until the final selection of button B. This allows the user to easily follow the selection process and to decide whether to abort the selection, if necessary, by moving the cursor.

In FIG. 7d, the final selection of button B is achieved after the lapse of the timer interval. The annular ring is filled up completely and the unselected buttons A, C, D are removed to indicate that button B has been definitely activated and a new content related to the B command will be displayed. By waiting for the predetermined time interval without a cursor movement, the user confirms the preliminary selected button for final selection. This type of user interaction is intuitive and easy to learn and reduces incorrect selections. Thus, the graphical user interface of the invention is user-friendly.

It is to be understood that the above-described example is provided only for explanatory purposes and many modifications may be made. For instance, the shape of the buttons may be rectangular, the command prompts may be more complex icons or symbols, the visual feedback may be designed in many different ways (e.g. in the form of a sandbox), and audio feedback or tactile feedback may also be provided. Furthermore, there are applications without the need of a cursor, so that it may be dispensed with.

The basic principles of the graphical user interface for the information display and delivery system of the invention will be explained in the following. The basic principle is to invite people to access information that has been displayed on a large flat panel in public space fast, just by waving their hands and following command indications on the screen. This has the advantage that it presents out of home media interaction for people on the move without any technical know-how or device. The user interface is smart in the following sense: It will recognize if a person is approaching the display and has remained in front of the display for a few seconds. So the display starts interaction by "talking" directly to the person.

A typical scenario for an application of the information display system according to the invention will be explained next: An advertising video for sport shoes is playing on the screen. A person is approaching the screen, the advertising changes due to the movement, and the main character in the spot is watching and focusing toward the person approaching the display. A written or spoken command like "welcome to the sport shoe design competition" may follow, and the person will find the following commands to interact with the display system on the display:
rotate the shoe,
apply new color,
download your design,
upload your message.

While the user is reading, the character in the spot is demonstrating the interaction of the icons on the screen just waving his hand. The interaction is mirrored and the character of the advert is interacting with the same icons being displayed, just from the "other side" of the screen.

The person takes the chance to reach out his hand and recognizes on the screen a kind of cursor actually following his hand when moving the hand round in front of the display. He may drag the cursor towards the icon "rotate the shoe". The person then listens to an acoustic feedback and the other icons flying back in space while the cursor changes to a hand on top of the shoe waiting and blinking for further interaction. The person reaches out for the hand icon and realizes, through sound and visual feedback, that he now can control the shoe position or orientation. Moving his hand, the shoe will rotate following his hand, as the shoe top is virtually glued to the person's hand. Resting the movement, a countdown indication will pop up with the hint—"remain in position". If there is no further movement indicated by the person in front of the screen, the shoe remains in the position. Now the buttons from the background begin coming to the front, like "apply new color". It is possible to select the button while placing the hand over the button and a count down indication gives the feedback as a mouse click. Now color circles will pop up around the shoe. The shoe pattern is divided in sections. When the person places his hand over one section, a count down feedback will confirm the selection. Then, it is possible to drag any color over the selection. As the person moves his hand away from the screen, the color remains there, etc.

The main interaction elements for controlling the displayed information are:
The user's hand (not finger; no touching necessary). 3D icons (animated in space, moving towards the front when requested, remaining in the back when other interactions are in process). The icons may be smart as they are able to change their size—importance—also due to the user's position in front of the screen. For example, the text font will change size in response to the reading position.

Various sound and visual feedbacks (when icons appear, disappear, or when one command is confirmed). Count down indication to indicate to the user that he has made a decision and soon the system will perform as requested. Here the user has the chance to intervene, if the command was not as requested. Logic sequences interconnected with graphical elements in between the 3D icons are provided as user guidance.

After dark screen explaining the new way of interacting with the public display via gesture movement. Simple screen games may be performed. Interactive help function. If the system realizes that the guest is not able to navigate properly, the system will initiate some help, provide simpler and bigger buttons, or provide on-screen help through a real person on the "other side" of the screen. The assistant on the other side will not see the person, but may understand his voice and his wrong interaction by hand in order to give suggestions. Tactile feedback through mobile phone vibrator or strong bass wave etc. at the user side is provided to complete the navigation experience.

The present invention will allow out of home media to become interactive. People are on the move and will have little time to interact with complicated interfaces and technologies. So, gesture interaction is the solution here. No touch screen is necessary; this improves the hygienic situation for public terminals and reduces costs, in particular for large screens such as 42" and bigger display panels. The invention provides the possibility for an easy and simple interaction with characters and icons on screens. It provides an immediate feedback to advertising and entertaining. Since the system is robust and unsusceptible, the screen may be placed in any public space.

The invention claimed is:

1. Information display system comprising a display unit having a display screen, a control unit for controlling the displayed information, and input means for inputting a use's control command,
wherein the input means comprise a distance detecting sensor and are adapted to detect a position of a user controlled object in a sensing field arranged with a given distance in front of the screen,
wherein the control unit is adapted to determine a display control command based on the detected object position; and
wherein the control unit is adapted to start a timer for a predetermined time interval when a correspondence between the position of a displayed control command prompt on the screen and the detected object position is determined.

2. Information display system according to claim 1, wherein the control unit is adapted to generate the control command when the correspondence between the prompt position and the object position persists until the timer expires, or when the object is directly removed from the sensing field after the timer has been activated and is not re-inserted before the timer expires.

3. Information display system according to claim 2, wherein the control unit is adapted to determine the control command according to a match of a displayed control command prompt and the detected object position.

4. Information display system according to claim 2, wherein the control unit is adapted to determine the control command according to a detected movement and/or velocity of the object.

5. Information display system according to claim 2, wherein the control unit is adapted to measure a time that the object is in and/or out of the sensing field.

6. Information display system according to claim 2, comprising feedback means for providing a visual, tactile, and/or acoustic feedback information to the user when the timer is operating.

7. Information display system according to claim 2, wherein the input means comprise a plurality of sensors which are arranged such that their detection beams propagate substantially parallel to the screen, forming a sensing field extending substantially parallel to the screen up to a predetermined distance from the screen.

8. Information display system according to claim 2, wherein the sensing field is divided in a grid of sensing areas, and the control unit assigns the detected position of the object to the corresponding sensing area.

9. Information display system according to claim 8, wherein the dimensions of the sensing areas relate to the size of the object.

10. Information display system according to claim 2, wherein the control unit is adapted to control the type, displayed size, and/or position of displayed information and/or of control command prompts depending on the correct performance of the sensor.

11. Information display system according to claim 2, wherein the input means are adapted to compensate a static object in the sensing field.

12. Information display system according to claim 2, comprising a database unit for storing information to be displayed.

13. Information display system comprising a display unit having a display screen, a control unit for controlling the displayed information, and input means for inputting a user's control command,
    wherein the input means comprise a distance detecting sensor and are adapted to detect a position of a user controlled object in a sensing field arranged with a given distance in front of the screen,
    wherein the control unit is adapted to determine a display control command based on the detected object position
    wherein the control unit is adapted ti start a timer for a predetermined time interval whwn a correspondence between the position of a displayed control command prompt on the screen and the detected object position is determined; and
    wherein the input means comprise a distance sensor to detect the distance Z of the object and/or the user from the screen.

14. Information display system according to claim 13, wherein the control unit is adapted to control the size, the type, and/or the position of displayed information and/or of control command prompts depending on the detected object or user distance Z.

15. Information display system comprising a display unit having a display screen, a control unit for controlling the displayed information, input means for inputting a user's control command, and wireless communication means for communicating with a wireless mobile device, in particular by using a short-range radio communication or infrared communication technology,
    wherein the input means comprise a distance detecting sensor and are adapted to detect a position of a user controlled object in a sensing field arranged with a given distance in front of the screen,
    wherein the control unit is adapted to determine a display control command based on the detected object position; and
    wherein the control unit is adapted to start a timer for a predetermined time interval when a correspondence between the position of a displayed control command prompt on the screen and the detected object position is determined.

* * * * *